United States Patent Office 3,472,527
Patented Oct. 14, 1969

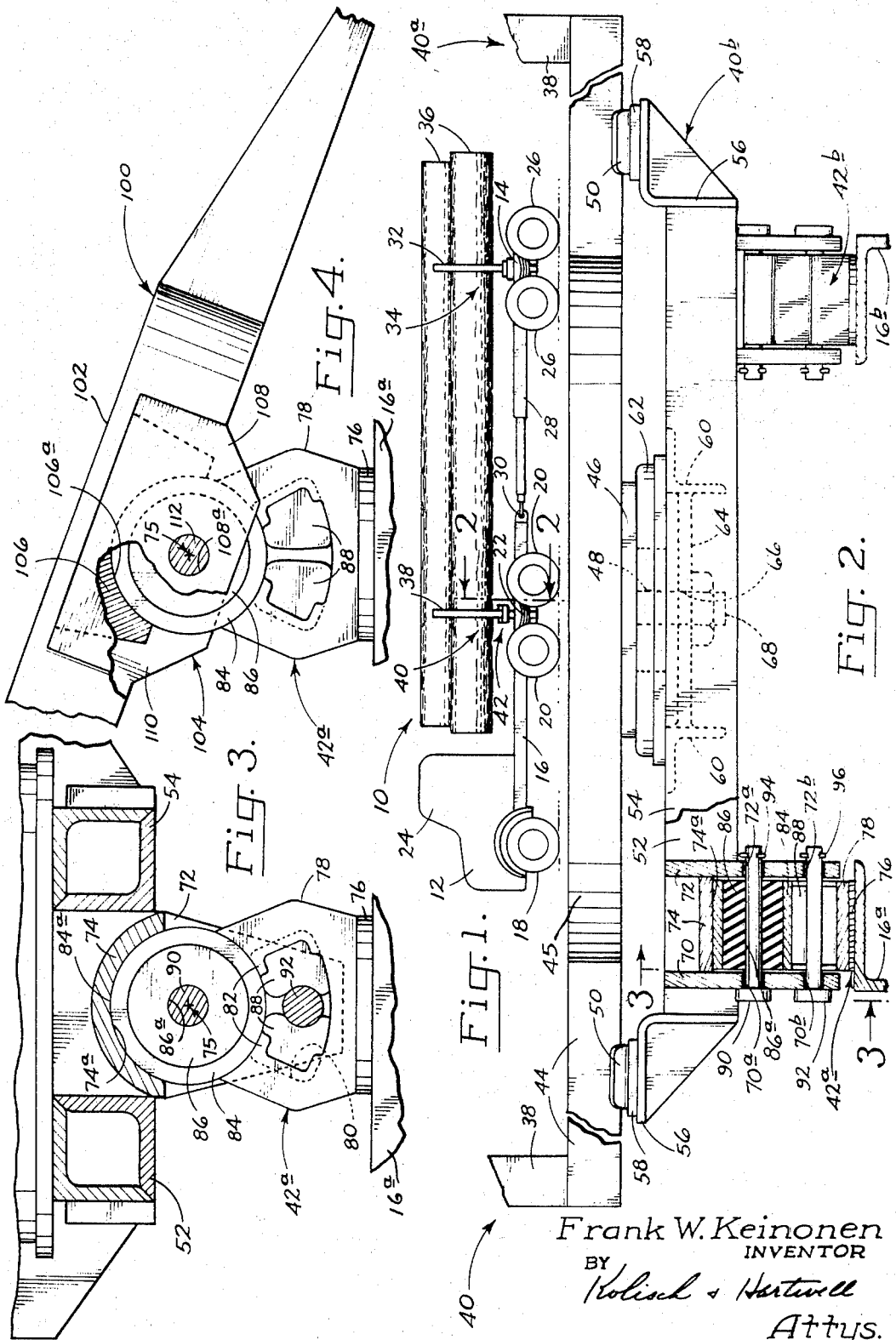

3,472,527
MEANS FOR MOUNTING A LOAD CARRIER ON A VEHICLE
Frank W. Keinonen, Hillsboro, Oreg., assignor to Pierce-Pacific Manufacturing, Inc., Portland, Oreg., a corporation of Oregon
Filed May 29, 1967, Ser. No. 642,048
Int. Cl. B62d 53/04
U.S. Cl. 280—404                                    7 Claims

ABSTRACT OF THE DISCLOSURE

Apparatus for mounting different types of load carriers on the frame of a truck, including spaced supports mounted on a truck frame providing arcuate bearing surfaces which support a load carrier and which accommodate pivoting about a substantially horizontal axis that extends transversely of the frame.

---

This invention relates to vehicles, and more particularly to novel means for mounting different types of load carriers on the frame of a truck.

In trucking operations where various kinds of loads are handled, it is often desirable, for reasons of convenience and economy, to equip a truck so that it can properly handle different load carriers which are used for such loads. In general terms, the present invention contemplates novel means which readily enables more than one type of load carrier to be mounted on a given truck.

More particularly, the invention features means which permits interchangeable connection to a truck frame of both a load-supporting bunk, which may be used to support an end of an elongated load such as logs, and also the lower part of a fifth wheel assembly, which may be used to support the lead ends of various trailers.

Where a load-supporting bunk is mounted on a truck, there are several important factors to consider. To facilitate placement of a load between the usual lateral stakes that form part of a bunk, it is desirable that the bunk normally be held in a position where its stakes are upright. However, to accommodate relative movement that may occur between a load and a truck during hauling, and to avoid undue stressing of the bunk and rubbing of a load, it is desirable further that a bunk be capable of shifting somewhat from such a position to move with the load.

To take these factors into account, the invention features novel supports for supporting a bunk on a truck frame which enable pivoting of the bunk about a generally horizontal axis that extends transversely of the frame. Also provided is novel biasing means which acts upon a bunk with the same mounted on the supports, resisting pivoting and urging the bunk to a position where its stakes are held substantially upright. The biasing means, while tending to hold the bunk in such a position, is yieldable to permit pivoting of the bunk to accommodate normal load displacement during hauling.

When the base of a fifth wheel assembly is mounted on a truck, there are other considerations which are important. The assembly must be able to pivot relatively freely about an axis extending transversely of the truck frame. This is necessary in order for the assembly properly to accommodate the usual relative movement that occurs between a truck and an attached trailer. Additionally, in order to minimize undesired forward and rearward movement of the fifth wheel in the assembly during such pivotal movement, the means pivotally mounting the assembly should provide a pivot axis which is relatively close to the plane of the fifth wheel plate in the assembly. The construction of the invention enables proper mounting of a fifth wheel assembly when such is substituted for a bunk, with the above problems taken care of.

Another feature and advantage of the invention is that it is relatively simple, compact and rugged in construction.

The invention further includes novel means for releasably connecting supports on a truck frame and a load carrier, which facilitates rapid and simply made interchange of different types of load carriers.

These and other features and advantages attained by the invention will become more fully apparent as the description which follows is read in conjunction with the accompanying drawings, wherein:

FIG. 1 is a simplified side elevation of a truck and trailer combination, more specifically one designed for the hauling of logs, where the truck has a bunk-type load carrier mounted on it through apparatus constructed according to the invention;

FIG. 2 is a cross-sectional view, on a somewhat larger scale, taken along the line 2—2 in FIG. 1, showing in more detail the apparatus of FIG. 1 which is employed to mount the load carrier on the truck;

FIG. 3 is a cross-sectional view, on a larger scale than FIG. 2, taken along the line 3—3 in FIG. 2; and FIG. 4 is a view, similar to and on the same scale as FIG. 3, showing the lower part of a fifth wheel assembly mounted on the truck.

Turning now to the drawings, and referring first to FIGS. 1 and 2, illustrated generally at 10 is a truck and trailer combination including a truck 12, also referred to herein as a vehicle, and a trailer 14.

Truck 12 includes the usual truck frame 16 comprising, as can best be seen in FIG. 2, elongated frame members 16a, 16b. Supporting the truck for movement over the ground are front and rear wheels 18, 20 respectively. These wheels are mounted on the frame through the usual spring suspension system, such as the one indicated generally at 22 for its rear wheels. A cab for the truck is shown at 24 which houses the usual truck controls.

Trailer 14 includes trailer wheels 26 which support the rear of the trailer for movement over the ground. The trailer further includes an elongated reach 28 which extends forwardly from the trailer wheels and is releasably secured to the truck through a suitable coupling 30. Coupling 30 is conventional, and accommodates both side swinging of the trailer relative to the frame of the truck, and up and down movement of the rear of the trailer relative to the truck frame.

Projecting upwardly from the trailer adjacent wheels 26 are opposed lateral stakes, such as stake 32, of a load-supporting bunk generally designated at 34. In FIG. 1 only one of the stakes of the bunk is visible, the other being obscured by a load of logs 36 handled by the truck.

The forward ends of logs 36 are cradled between opposed, upright, lateral stakes 38 of a bunk assembly, or load carrier, 40. Bunk assembly 40 is mounted on the frame of the truck through structure, indicated generally at 42 which forms this invention.

Considering in further detail the construction of bunk assembly 40 and structure 42, and referring particularly to FIGS. 2 and 3, the bunk assembly includes upper and lower parts 40a, 40b, respectively. The upper part of the bunk assembly includes, in addition to stakes 38, an elongated base 44 extending transversely of the truck frame which joins the bottom ends of stakes 38. The base provides support for the bottom of the load cradled in the bunk. Shown at 45 (see FIG. 2) is a small platform which is joined to base 44 between its ends and projects laterally of the base a short distance. The platform, known as a sleeper, directly underlies a load of logs placed in the bunk assembly, and functions by extending along the base of a log load to maintain stakes 38 generally normal to the log load. A similar sleeper may be provided in trailer 14 for keeping its stakes 32 normal to the log load.

Joined to the underside of base 44 midway between its ends is a plate 46 of generally circular outline, and a pin 48 disposed centrally of this plate and extending vertically downwardly therefrom. Plate 46 and pin 48 form part of pivot connection in the bunk assembly holding part 40a in place on part 40b while accommodating swiveling of the former about an upright axis. Also suitably fixed to the underside of the base adjacent opposite ends thereof are shoes 50.

Lower part 40b of the bunk assembly comprises a pair of elongated, laterally-spaced, substantially parallel bars 52, 54. Joining together each adjacent set of ends of the bars are angle iron pieces 56 with rub irons 58 joined to the top faces of the pieces. The rub irons underlie the bottom surfaces of previously-mentioned shoes 50, and slidably support the shoes and through the shoes any load carried by part 40a. Also joining together bars 52, 54, at locations spaced inwardly from their ends, are angle iron pieces 60.

Fastened to the top surfaces of bars 52, 54 is a plate 62 of generally circular outline which supports plate 46. Also joined to the bars, beneath plate 62, is a plate 64 having a bore 66 extending downwardly through the center thereof. Pin 48 extends downwardly through bore 66 and has a fastener, such as fastener 68, mounted thereon holding the pin against retraction from the bore.

Adjacent each set of ends of bars 52, 54, and mounted on the bars, is a pair of laterally spaced-apart, downwardly-projecting ears or elements, such as ears 70, 72. The ears include upper bores 70a, 72a and lower bores 70b, 72b. The upper bores are aligned, as are the lower bores.

Suitably joined to and extending between each of the ears in a pair is a saddle, such as saddle 74. Each saddle has a downwardly-facing arcuate saddle surface, such as surface 74a, for saddle 74. The saddle surfaces for the saddles on opposite sides of the truck frame have substantially the same radius of curvature, and curve about a common axis which extends transversely of the truck frame (the axis shown at 75 in FIG. 3).

Apparatus 42 includes a pair of supports 42a, 42b which are mounted on top of frame members 16a, 16b, respectively. These supports are substantially the same in construction. Considering support 42a, it includes a base plate 76 suitably joined to the top face of frame member 16a, a standard 78 mounted on top of plate 76, and a hollow cylindrical bearing 84 joined to the top of the standard. An opening 80 of arcuate shape when viewed as in FIG. 1, extends through and opens onto opposite sides of the standard in a region located between the base and bearing. Rimming portions of opening 80 on opposite sides of the standard are flanges such as those shown at 82.

Bearing 84 has an upwardly-facing convex bearing surface 84a curving about axis 75 to have a curvature matching that of previously-mentioned saddle surface 74a. The corresponding bearing in support 42b is axially aligned with bearing 84.

Mounted snugly within the interior of the bearing is a cylindrical cushioning member 86 having an axial bore 86a. Cushioning member 86 may be formed of any suitable elastomeric material.

Mounted snugly within the interior of opening 80 in the standard are a pair of spaced-apart biasing portions or pads 88. Such pads may be formed from material similar to that used for cushioning member 86. Flanges 82 overlie marginal portions of pads 88 and function to maintain the pads in place.

Bunk assembly 40 is mounted on supports 42a, 42b, with the saddles in the assembly resting upon and slidably engaging the bearings of the supports. The bunk assembly is connected to each support through a pair of pins, such as pins 90, 92 shown in connection with support 42a. Pin 90, which constitutes releasable connecting means in the invention, projects through bores 70a, 72a of ears 70, 72, and through axial bore 86a of cushioning member 86. The pin may be held in place by means of a cotter pin 94. Pin 90, and the corresponding pin connecting assembly 40 to support 42b, accommodate pivoting of the bunk assembly about an axis which corresponds to the common axis of curvature of the saddle surfaces (axis 75).

Pin 92, which comprises a pivot-inhibiting portion herein, projects through bores 70b, 72b and through opening 80 between biasing members 88. Pin 92 fits tightly between the biasing members, and as can be seen clearly in FIG. 3, causes some distortion of the opposing faces of the members. The pin may be held in place by means of a cotter pin 96.

With bunk assembly 40 mounted on supports 42a, 42b in the manner described, the stakes of the bunk assembly are normally held substantially upright because of the action of pads 88, which bias pin 92 to a position directly below pin 90. This facilitates placing a load on the assembly. However, because the biasing members are yieldable under pressure, with the truck hauling a trailer over uneven terrain, and with up and down movement of the trailer relative to the truck, the bunk assembly is enabled to pivot about an axis extending transversely of the truck frame to accommodate load movement relative to the frame. Members 88 resist such pivoting and tend to return the bunk to a position where its stakes are upright.

The pins connecting the bunk assembly to the supports enable the assembly to be connected to or removed from the supports rapidly and easily.

Ears 70, 72 which project downwardly from bars 52, 54 of load carrier 40 to straddle standard 78, in conjunction with pin 92 which interconnects bottom ends of the ears at a point below bearing 84, may be thought of as positioning arm structure in the construction, with the pin being a bottom portion of this arm structure. This is because these parts function, as acted upon by opposed pads 88, normally to position the load carrier 40 in the substantially horizontal position of FIG. 1.

Turning now to FIG. 4, this illustrates the lower part 100 of a fifth wheel assembly mounted on supports 42a, 42b, with the part inclined from the horizontal. This inclined position for the part is the one that it normally assumes when no trailer is connected through the fifth wheel part to the truck. Part 100 is conventional, and includes an upwardly facing fifth wheel plate 102 for supporting the usual cooperating fifth wheel plate which is part of the trailer (not shown), and mounting structure, such as structure 104, suitably joined to the base of plate 102 adjacent each side of the plate. Only one of such mounting structures is visible in the figure.

Describing the construction of structure 104 (the mounting structure on each side of the fifth wheel plate being the same), it includes a saddle 106 which is somewhat similar in configuration to previously-described saddle 74, having a downwardly-facing, arcuate saddle surface 106a which corresponds to saddle surface 74a. The curvature of the saddle matches the curvature of bearing surface 84a.

Disposed adjacent ends of the saddle in the structure are a pair of downwardly projecting elements or ears 108, 110. Each ear includes a bore, such as bore 108a shown for ear 108, and the bores in the two ears are aligned.

Fifth wheel part 100 is mounted on supports 42a, 42b by means of pivot pins, or releasable connecting means, which connect each pair of ears in a mounting structure to one of the supports. Such a pin is illustrated at 112 in FIG. 4 connecting ears 108, 110 to support 42a. The pin, like pins 90 in the form of the invention shown in FIG.

3, passes through bore 86a in cushion member 86. Pin 112 may be held in place by means of a suitable cotter pin (not shown).

With fifth wheel part 100 mounted on the supports, the saddles of the support structures slidably engage and rest upon the bearing surfaces in the supports. The pins provide a pivot axis for the fifth wheel part which coincides with axis 75.

It should be noted that with the fifth wheel part mounted in place as shown in FIG. 4, the pivot axis provided for the part is relatively close to the plane of fifth wheel plate 102. This close spacing minimizes fore and aft movement occurring in the fifth wheel plate during pivoting of part 100. With a load carrier such as fifth wheel part 100 mounted on the truck, the truck is equipped to have any kind of trailer provided with the usual cooperating fifth wheel assembly.

Thus, the invention provides novel structure which permits rapid and simple interchangeable mounting of different kinds of load carriers on a truck frame. More specifically, it permits both a load-supporting bunk assembly and the lower part of a fifth wheel assembly to be so mounted. And as has been indicated, the connection provided for each type of carrier permits appropriate movement of the carrier relative to the truck frame.

It is claimed and desired to secure by Letters Patent:

1. In a vehicle including a vehicle frame extending longitudinally of the vehicle and having a load carrier disposed over said frame, a mounting for said load carrier comprising, on each side of the vehicle, a saddle operatively joined to and disposed under the load carrier having a downwardly facing arcuate saddle surface with the axis of the curvature of said surface extending transversely of said frame, a standard mounted on said frame, a bearing element mounted on the top of said standard having an upwardly facing arcuate bearing surface curved to complement said saddle surface, said bearing surface being received within said saddle surface, positioning arm structure operably joined to said load carrier projecting downwardly from the load carrier through said axis of curvature and having a bottom portion disposed below said bearing element, means releasably connecting said standard and said arm structure accommodating pivoting of the load carrier about an axis corresponding to said axis of curvature, and opposed biasing portions mounted on said standard disposed on opposite sides of said bottom portion exerting a bias thereon yieldably resisting pivoting of said load carrier.

2. The mounting of claim 1, wherein said positioning arm structure comprises an ear joined to said carrier and extending downwardly past one end of said saddle and said bearing element, and the bottom portion of said arm structure comprises a pin projecting from said ear substantially paralleling said axis of curvature, and said biasing portions are disposed to the front and rear sides of said pin.

3. The mounting of claim 1, wherein said arm structure comprises opposed ears extending downwardly from the load carrier over opposite ends of said saddle and bearing element, and the means releasably connecting said standard and arm structure comprises a pin extending through said bearing element at the location of said axis of curvature and through said ears.

4. The mounting of claim 3, wherein the bearing element comprises a hollow cylinder, a cylindrical cushioning member is lodged within the bearing element, and said pin extends through said cylindrical cushioning element.

5. The mounting of claim 1, wherein said positioning arm structure comprises a pair of ears joined to the load carrier extending downwardly therefrom across opposite ends of said saddle and said bearing element and straddling said standard, and the bottom portion of said arm structure comprises a pin joined to and extending between said ears.

6. The mounting of claim 5, wherein said standard has an opening in the base thereof extending between opposite sides of the standard, said biasing portions are mounted on said standard within said opening, and said pin extends through said opening between said biasing portions.

7. The structure of claim 6, wherein said biasing portions comprise spaced elastomeric members.

References Cited

UNITED STATES PATENTS

| 2,520,776 | 8/1950 | Page | 280—404 |
| 2,468,013 | 4/1949 | Kayler | 280—438 |
| 2,507,616 | 5/1950 | Stephen | 280—440 |
| 3,123,380 | 3/1964 | Grim | 280—404 |
| 3,356,387 | 12/1967 | Skirvin | 280—404 |

FOREIGN PATENTS

| 705,343 | 4/1941 | Germany. |
| 830,303 | 3/1960 | Great Britain. |

LEO FRIAGLIA, Primary Examiner

U.S. Cl. X.R.

280—440